Patented Apr. 22, 1941

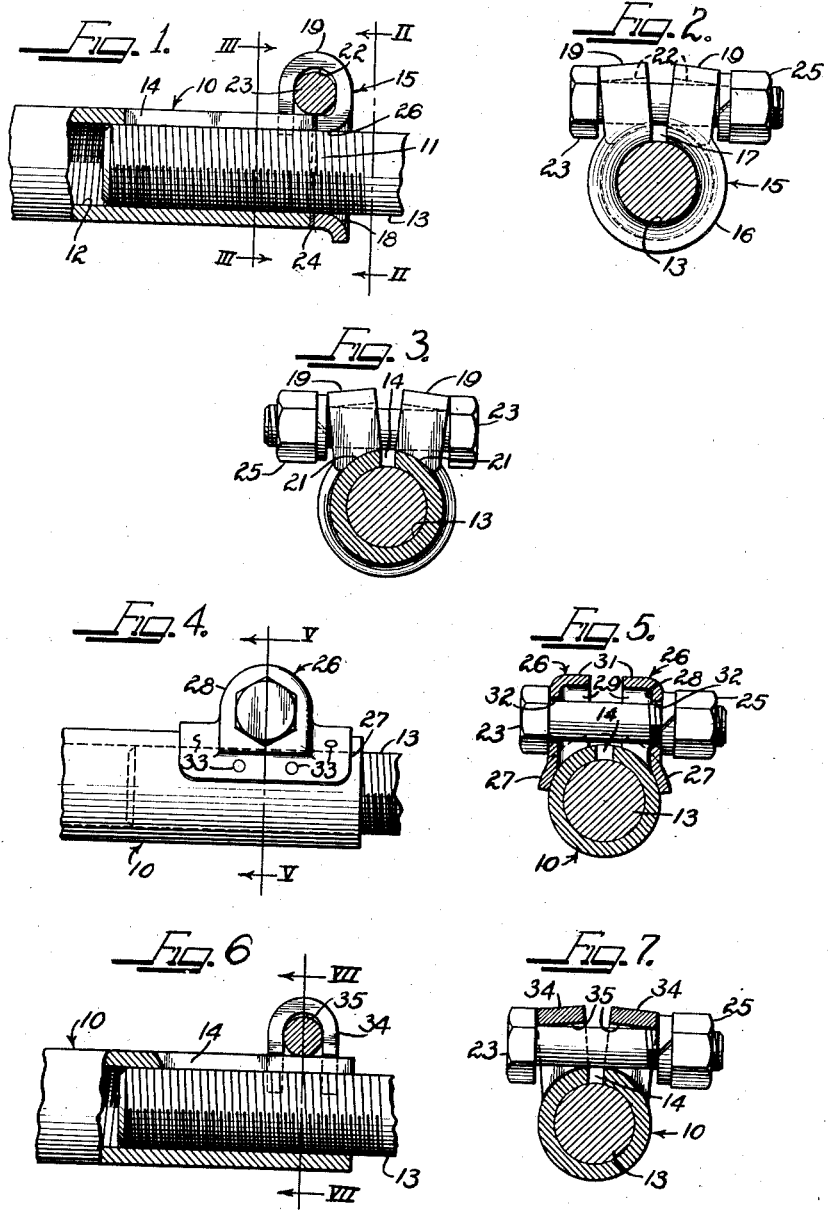

2,238,937

UNITED STATES PATENT OFFICE 2,238,937

CLAMP ASSEMBLY

George H. Hufferd and Homer B. Stuart, Detroit, Mich., assignors to Thompson Products, Incorporated, Cleveland, Ohio, a corporation of Ohio Application July 15, 1939, Serial No. 284,741

1 Claim. (Cl. 287—62)

This invention relates to clamp assemblies adapted to receive and contract around inserts therein. The invention also includes a process of making such clamping members of strips of metal.

More specifically, this invention relates to a clamping assembly for tie-rods or the like, whereby the tie-rods are provided with clamping ears welded thereon for contracting the tie-rod tube around an insert. This invention specifically includes a process of making such clamping assemblies from flat strip metal stock by bending and welding operations.

While the invention will be hereinafter specifically described in connection with tie-rods, it should be understood that the principles of the invention are not limited to such use and that the process and product of the invention relate to the provision of clamping assemblies in general.

Tie-rods have heretofore been prepared from seamless or butt-seam tubing. The ends of the rods have been internally threaded and longitudinally slotted along the threaded ends. Separate clamping rings have been disposed around the ends of the tie rods for contracting the diameter thereof around the shanks of tie rod joints that have been threaded into the rods. This construction has not been entirely satisfactory, as it has been expensive, required many mechanical operations, and involved the use of separate clamping rings which did not form a direct part of the tie-rods.

The present invention now provides for the manufacture of clamping assemblies with the tie-rods by simple bending and welding operations. The resulting assemblies provide tie-rods having integral clamping ears thereon which take the place of the previously used separate clamping rings.

According to this invention, the clamping members are formed from flat metal strips by bending only. The clamping ear segments, in any of the disclosures and modifications herein, are so shaped as to be welded to the tie-rod in such a position that a drawing together of such ears will contract the tie-rod around an insert therein.

A feature of the invention includes the formation of the clamping ears by outwardly extending walls depending from opposite sides of a tie-rod slot in spaced opposed relation.

Another feature includes bending the clamping ear walls transversely of the tie-rod slot to prevent flexing of the ears when they are drawn toward each other by means of a clamping bolt.

It is, then, an object of this invention to provide a clamping member for permanent assembly with a tie-rod having integral dependent ears for contracting the tie-rod about an insert.

Another object of the invention is to form from flat metal strip stock a clamping member having integral clamping ears.

A further object of the invention is to provide a clamping member of the split-ring type having integral spaced opposed ear portions formed by bending the walls thereof transversely to the direction of force to be exerted therebetween to resist flexing of the ears when such drawing force is exerted.

A further object of the invention is to provide clamping members from flat metal strips by stamping and bending operations.

Another object of the invention is to provide an assembly of clamping members of one of the types described with a tie-rod by spot-welding operations.

Still another object of the invention is to provide an assembly of a clamping member of another of the types described with a tie-rod by a butt-welding operation.

A further object of this invention is to provide a tie-rod having integral opposed clamping ears, separated by a slot in the tie-rod along a portion of its length, adapted to cooperate with a clamping bolt for decreasing the width of the slot to contract the rod diameter.

Other and further objects of the invention will become apparent to those skilled in the art from the following detailed description of the annexed sheet of drawings, which discloses preferred embodiments of the invention.

On the drawing:

Figure 1 is a broken vertical sectional view, with parts in fragmentary elevation, along a portion of the length of a clamping assembly according to this invention;

Figure 2 is an end elevational view, with a part in cross-section, taken along the line II—II of Figure 1;

Figure 3 is a vertical cross-sectional view taken along the line III—III of Figure 1, with parts in elevation;

Figure 4 is a fragmentary side elevational view of a modified form of a clamping assembly according to this invention;

Figure 5 is a vertical cross-sectional view taken along the line V—V of Figure 4, with parts in elevation;

Figure 6 is a broken vertical sectional view, with parts in fragmentary elevation, of another modification of the clamping assembly according to this invention;

Figure 7 is a vertical cross-sectional view taken along the line VII—VII of Figure 6, with parts in elevation.

As shown on the drawing:

In Figure 1, the reference numeral 10 designates generally a tie-rod according to this invention. The tie-rod 10 has an open end 11 which is internally threaded as at 12 for a desired distance into the rod, for receiving in threaded relation the shank 13 of a tie-rod joint (not shown). A slot 14 is provided in the tie-rod 10 extending inwardly for a desired distance longitudinally from the threaded end thereof. As disclosed in Figure 1, this distance is usually less than the length of the threaded relation between the tie-rod 10 and the shank.

The reference numeral 15 designates generally a clamping member according to this invention. The clamping member 15 is formed from a flat piece of metal having a thickness substantially the same as the wall thickness of the tie-rod 10.

The flat piece of metal is bent or stamped to form a split-ring 16, as shown in Figure 2, providing a slot 17 therebetween. A cross-section of this split-ring 16 is identical with a cross-section of the tie-rod 10. The outer end of the split-ring 16 is flared outwardly as at 18 to a bell-mouth shape. Extending portions of the ring are bent away from the bell-mouth 18 to form outside looped ears 19. The free ends 21 of the ears 19 are shaped to the curved surface of the tie-rod 10. As shown in Figures 1 and 2, the ears 19 are spaced and oppositely disposed from each other and define aligned apertures 22 therethrough for receiving a clamping bolt 23.

As shown in Figure 1, the clamping member 15 is aligned with and butt-welded, as at 24, to the end 11 of the tie-rod 10. The slot 17 of the clamping member 15 then becomes an extension of the tie-rod slot 14. The free ends 21 of the ears 19, as shown in Figure 3, can be welded to the tie-rod 10, if desired. However, if metal of sufficient strength to resist torsion when clamping pressure is applied is used to form the ears 19, no welding of the free ends 21 is necessary.

When an insert, such as the shank 13 is inserted within the tie-rod 10 in loose threaded relation therewith, a tightening of the clamping bolt 23 by a nut 25 will draw the ears 19 towards each other. By so doing, the width of the tie-rod slot 14 is decreased, and the tie-rod diameter is contracted to clampingly engage the insert 13. It is to be noted that the ears 19 are sufficiently wide to resist flexing as they are drawn together.

While the preferred embodiment, as disclosed in Figure 1, shows the clamping member 15 shaped with a bell-mouth 18, this mouth can also be of the same diameter as the tie-rod 10. By flaring the mouth, entrance thereto is facilitated.

The internal portion 26 of the clamping member 15 can also be internally threaded simultaneously with the threading of the tie-rod. This will remove welding flash metal and will give additional support to the clamping member when the insert therein is clampingly engaged.

From the above description of Figures 1 to 3, it should be understood that the clamping member 15 may be bent or stamped into the desired shape by compound dies around shaping mandrels in a single step. The clamping assembly thus formed has great strength, and the integral ears on the clamping member are shaped to resist flexing when a clamping pressure is exerted thereagainst.

In the modification shown in Figures 4 and 5, the reference numeral 10 again designates a slotted tie-rod having a threaded end within which is inserted a shank 13 in threaded relation thereto. The clamping device of this modification comprises a pair of members 26, both of which are identical. Each member 26 comprises a base portion 27, curved to seat along a portion of the length of the tie-rod 10. A substantial portion of the center of the base 27 is disposed transversely outward to form an upstanding wall 28 having the sides 29 and the top 31 turned inwardly to form a box-like portion. At the center of this box-like portion, a hole 32 is provided to receive a clamping bolt 23. The clamping members 26 are then spot-welded or otherwise secured to the tie-rod 10 adjacent its threaded end, one on each side of the slot 14, and having their inner faces parallel and adjacent to said slot. Figure 4 discloses the spot-welding as at points 33. Both clamping members 26 face each other so as to align the bolt holes 32.

The insert 13 is clampingly secured within the tie-rod 10 in the same manner as that shown in Figures 1 to 3. A tightening of the clamping bolt 23 by the nut 25 draws the clamping members 26 towards each other, thereby decreasing the width of the slot 14 and contracting the tie-rod 10 around the threaded insert 13. The outer faces of the walls 28 are substantially parallel with each other and with the sides of the slot 14. The clamping assembly thus formed has great strength in proportion to the thickness of the metal used in the clamps 26, as the box-like portions are rigidly reinforced against bending by the inturned edges thereof.

A further modification of this invention is shown in Figures 6 and 7. The reference numeral 10 again designates the tie-rod which has a longitudinal slot 14 along a portion of its internally threaded end. The clamping device herein is formed by a pair of ears 34, each shaped from flat metal strips. A flat metal strip of substantially rectangular shape, having its free ends curved to seat on the outside of the tie-rod 10, is bent to a U-shape. A pair of such U-shaped ears 34 are inverted and projection welded or otherwise secured to the tie-rod 10. They are secured, one on each side of the slot 14, adjacent the end of the tie-rod in such a manner that the U-shaped holes 35 are in transverse alignment to said slot. The resulting assembly is operative in the same manner as the other structures defined herein. By tightening the bolt 23 by the nut 25, the ears 34 are drawn toward each other, thereby contracting the tie-rod 10 around the threaded insert 13.

It should be appreciated that the bending, stamping and welding operations can be widely varied without departing from the principles of this invention. The invention, in its broader aspects, includes the formation of clamping members from strip stock which provides clamping ears to be integrally secured to a clamping assembly.

It will, of course, be understood that numerous details of construction may be varied through a wide range without departing from the principles of this invention, and it is therefore not the purpose to limit the patent granted hereon otherwise than necessitated by the scope of the appended claim.

We claim as our invention:

A rod and joint shank assembly comprising a rod having an internally threaded longitudinally slotted end portion, an externally threaded joint shank adapted for threading into said end portion, a pair of U-shaped metal ears of appreciable width having the ends of the legs thereof curved to fit around a portion of said rod, welds fixedly uniting each ear on an opposite side of said slot with the wide side walls of the ear in angular relation to the slot and with the outer edges of the ears in diverging relationship, said rod extending between the legs of each ear to cooperate with the ears for defining clamping bolt chambers isolated from the interior of the rod, and a clamping nut and bolt assembly extending through both chambers and across said slot to initially apply contracting forces to the bight of the ears due to the diverging outer edges thereof for exerting enhanced leverages for contracting the rod around the shank threaded therein to lock the shank in the rod.

GEORGE H. HUFFERD.
HOMER B. STUART.